United States Patent [19]
Lohmann

[11] 3,877,941
[45] Apr. 15, 1975

[54] NITRO-SUBSTITUTED ARYL AMIDE AMINE PROGENITOR AND THE USE THEREOF IN PHOTOGRAPHIC PROCESSES

[75] Inventor: Joachim Werner Lohmann, Wilrijk, Belgium

[73] Assignee: Agfa-Gevaert, Mortsel, Belgium

[22] Filed: June 29, 1973

[21] Appl. No.: 374,974

[30] Foreign Application Priority Data
June 30, 1972 United Kingdom............... 30885/72

[52] U.S. Cl. ............... 96/48 R; 96/48 QP; 96/88; 96/115 R; 96/90 R; 260/482 C; 260/471 C; 260/468 E
[51] Int. Cl. ....... G03c 5/24; G03c 1/00; G03c 1/52
[58] Field of Search ........ 96/88, 90 R, 115 R, 48 R, 96/48 QP; 260/482 C, 471 C, 468 E

[56] References Cited
UNITED STATES PATENTS

| | | | |
|---|---|---|---|
| 3,342,597 | 9/1967 | Harnish et al. | 96/95 |
| 3,719,492 | 3/1973 | Barr et al. | 96/95 |

Primary Examiner—Norman G. Torchin
Assistant Examiner—Won H. Louie, Jr.
Attorney, Agent, or Firm—William J. Daniel

[57] ABSTRACT

A photographic process, wherein an amine is information-wise produced by the information-wise exposure to activating electromagnetic radiation of a recording material containing in or on a support a photosensitive amine progenitor corresponding to the following general formula:

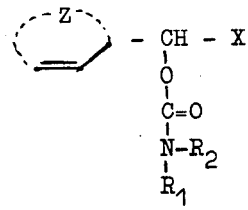

in which:
Z represents the necessary atoms to close an aromatic ring or ring system including such ring or ring system in substituted state,
X represents hydrogen or an organic group, and
each of $R_1$ and $R_2$ (same or different) represent hydrogen or an organic group, or $R_1$ and $R_2$ together represent the necessary atoms to close a nitrogen-containing ring or ring system, said photosensitive amine progenitor being capable of splitting off photolytically the compound

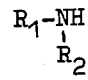

in which $R_1$ and $R_2$ have the significance as defined above.

10 Claims, No Drawings

NITRO-SUBSTITUTED ARYL AMIDE AMINE PROGENITOR AND THE USE THEREOF IN PHOTOGRAPHIC PROCESSES

This invention relates to a photographic process and recording materials in which amino compounds are produced photolytically and to particular photosensitive amine progenitors.

Photographic processes are known in which acids are produced information-wise, e.g., from the United Kingdom Patent Specification Nos. 1,070,863; 1,140,524 and the United Kingdom Patent Application No. 48,804/71. The photochemically formed acids are suited, e.g., for the production of dye images and the information-wise insolubilization of polymers by catalysis of a condensation reaction.

In organic chemistry amines are among the most important classes of compounds undergoing many and varied organic reactions. Organic amines and more especially aromatic amines are important intermediate compounds in the preparation of dyestuffs.

It is an object of the present invention to provide a photographic process in which amino compounds are produced information-wise in a recording material.

It is a further object of the present invention to use photographically produced amino compounds in visible image formation.

Other objects and advantages of the present invention will appear from the further description and Examples.

A photographic process has now been found, wherein an amine is produced information-wise by the informationwise exposure to activating electromagnetic radiation of a recording material containing in or on a support, e.g., in a solid polymeric binder, a compound corresponding to the following general formula:

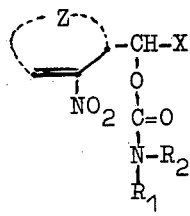

in which:

Z represents the necessary atoms to close a nitrosubstituted aryl group, e.g., a nitrophenyl group or such groups in substituted state, e.g., substituted with alkoxy, X represents hydrogen, or an organic group, e.g., an aliphatic, cycloaliphatic, aromatic or heterocyclic group, more particularly an alkyl group including a substituted alkyl group, an aryl group including a substituted aryl group preferably a nitro-substituted phenyl group having the nitro group in ortho-position to the $$-\underset{|}{C}H-X$$

group, and each of $R_1$ and $R_2$ (same or different) represents hydrogen or an organic group or $R_1$ and $R_2$ together represent the necessary atoms to close a nitrogen-containing ring or ring system, said photosensitive amine progenitor being capable of splitting off the compound

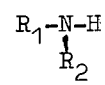

in which $R_1$ and $R_2$ have the significance as has been defined above.

For example, when $R_1$ is an aromatic group, e.g., a phenyl, naphthyl or anthryl group including said groups in substituted state and $R_2$ is hydrogen aromatic amines are produced that are suited for a dye-forming reaction known to those skilled in the art.

When $R_1$ and/or $R_2$ is (are) an aliphatic or cycloaliphatic group, amines are produced that fairly strongly raise the pH of the medium. Said amines may catalyze a dye-forming reaction or effect a colour change in a pH-indicator dye.

When $R_1$ and $R_2$ form part of a ring structure, heterocyclic amines, e.g., piperidine, morpholine, pyrrolidine or cyclic amino acids, e.g, proline are set free photolytically. The cyclic amines are strongly raising the pH. The amino acids may be detected by a typical colour reaction, e.g., with ninhydrin.

When $R_2$ is hydrogen and $R_1$ is a polymeric group to which the amino group is attached such as in a protein, the photolytically liberated amino group may serve to make cross-links with a cross-linking agent, e.g., a bisepoxide, and form therewith an insolubilized polymer mass.

Another way to achieve image-wise cross-linking is to use an amine progenitor producing a polyfunctional amine, e.g., diamine, capable of acting as cross-linking agent, e.g., in a resin containing free epoxy groups.

The photolytic process applied in the present invention may be represented by the following reaction scheme:

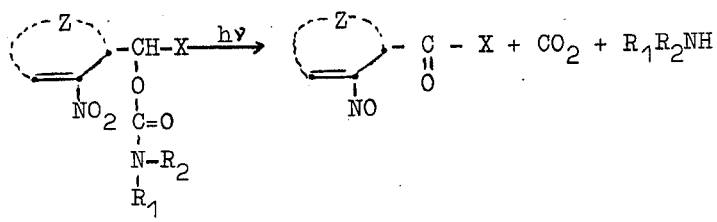

As an illustration of the present invention specific compounds that behave according to that reaction scheme are listed in the following Table with their melting point.

Table

| Compound | Structural formula | Melting point °C |
|---|---|---|
| 1 | 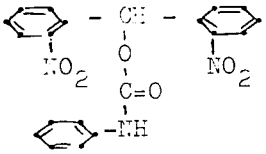 | 186 |
| 2 | 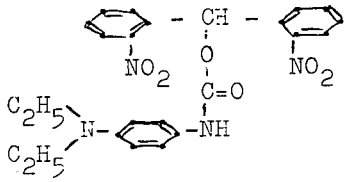 | 208 |
| 3 | 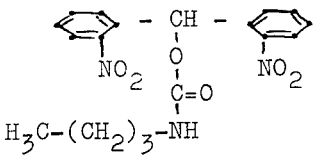 | 131 |

Preparation of Compound 1

20 g of 2,2′-dinitro-benzophenone [W. Staedel, Liebigs Ann.283, 164 (1894)] are reduced according to the method of Meerwein-Ponndorf described in Organikum, 3rd Ed. VEB Deutscher Verlag der Wissenschaften, Berlin (1964) p. 453, using 500 ml of a mixture of isopropanol and toluene (1:1) as solvent. The reduction yields yellow crystals of 2,2′-dinitro-benzohydrol 15.7 g. Melting point: 126°C.

5 g of 2,2′-dinitro-benzohydrol are dissolved in 200 ml of absolute toluene and 5 ml of phenylisocyanate and 2 ml of pyridine are added.

The mixture is refluxed for 2 h, the solvent evaporated and the residue washed with ether and recrystallized from benzene.

Yellow crystals of compound 1 are obtained. Yield: 90 percent. Melting point: 186°C.

Compounds 2 and 3 of the Table are prepared accordingly by using p-N,N-diethylaminophenylisocyanate and n-butylisocyanate respectively. The recrystallization of both compounds proceeds from methanol.

Compound 2 separates as reddish crystals and compound 3 as yellow crystals. The melting points are 208 and 131°C respectively.

The amine produced in the photolytic reaction can be of the type that is suited for a dye-forming reaction either as a catalyst or as a reaction partner.

The N,N-dialkyl-p-phenylenediamine derivatives are well known colour developers used in silver halide colour photography. In the oxidative coupling of such developers with a colour coupler dyes of the azamethine or indophenol type are formed. Suitable phenol, naphtol and active methylene type colour couplers for such oxidative coupling(s) are described by P. Glafkides — Photographic Chemistry, Vol. II (1960) 593–615 — Fountain Press — London.

An amine progenitor that is yielding an amine capable of serving as colour developer is exemplified by compound 2.

A photographic recording material suited for dye image formation based on the use of a photosensitive amine progenitor producing an amine serving as colour developer contains preferably that photosensitive amine progenitor in intimate admixture with a colour coupler and an oxidant incorporated in a binder layer.

The oxidant has to be selected in order to yield a fast colour reaction in the exposed area without fog (dye formation) in the image background area. For that purpose peroxyserbacic acid used as peroxysebacic-urea inclusion compound [(HO$_3$C—(CH$_2$)$_8$—CO$_3$H)$_x$(H$_2$N—CO—NH$_2$)$_y$ wherein $x:y$ = 1:11.7] proved to be particularly useful.

Peroxides such as dibenzoyl peroxide and p,p′-di-(tert.butyl)dibenzoyl peroxide offer a very fast dye formation, however, associated with background colouration.

For the preparation of such photosensitive material the photosensitive amine progenitor(s), the coupler(s) and optionally the oxidizing agent, e.g., are applied together from a solution or dispersion preferably in the presence of a film-forming binding agent to a suitable support.

As binding agent for the photosensitive layer all kinds of natural, modified natural and synthetic resins can be used, e.g., proteins, such as gelatin, cellulose derivatives, e.g. a cellulose ether such as ethylcellulose, cellulose esters, carboxymethyl cellulose, alginic acid and derivatives, starch ethers, galactomannan, polyvinyl alcohol, poly-N-vinylpyrrolidone, polymers derived from α, β-ethylenically unsaturated compounds, e.g, homo- and co-vinyl polymers such as polyvinyl chloride, copolymers of vinyl chloride and vinyl acetate partially saponified polyvinyl acetate, copolymers of acrylonitrile and acylamide, polyacrylic acid esters, polymethacrylic acid esters, or polyethylene.

The ratio by weight of amine progenitor to binder is, e.g., 1:5 to 1:50.

The recording material may consist of a self-supporting sheet or may comprise a photosensitive layer applied to a support, e.g., sheetlike or ribbonlike support. Suitable supports are, e.g., supports of paper or which glassine paper is preferred, and resin supports known in silver halide photography. It is also possible to apply the photosensitive material to glass or to a support from which it can be stripped off and transferred to a permanent support.

The information-wise exposure to activating electromagnetic radiation applied in the present invention may be a contact exposure as well as an optical projection exposure as is used, e.g., in an optical enlarging apparatus. The information-wise exposure need not be simultaneous in all parts of the recording material. The exposure may be progressive in a continuous step as, e.g., in sound track recording or in successive intermittent steps provided that the required information-wise change is obtained. Thus, the recording material may be scanned with an imagewise modulated radiant energy spot of high intensity, e.g., a laser beam, or the material may be progressively exposed through a slit, e.g., exposed to copying light of a tubular lamp that is given a translation movement along the original.

The information to be recorded may be of any desirable type, e.g., information in the form of images, codemarks, dots and lines, alpha-numerical writing and data in analogon form such as sound tracks.

After the information-wise photo-exposure the recording material may be overall heated to accelerate the diffusion of the formed amine towards (a) reaction partner(s) that is (are) optionally present in a receiving material and/or to enhance its chemical reactivity.

The following examples illustrate the present invention.

EXAMPLE 1

To a baryta-coated photographic paper base a composition containing the following ingredients was applied at a coverage of 6 g per sq.m:

compound 2 of the Table      40 mg

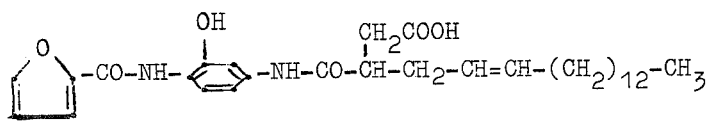

dissolved in 1 ml of methanol the
inclusion compound of peroxysebacic acid
and urea (1/11.7)      100 mg 10 % by weight solution in acetone of poly-
methylmethacrylate      2.5 ml The dried coating was contact-exposed for 60 sec. through a transparent line original with a ultra-violet lamp of 1,000 W (Actina SH, trade name) placed at a distance of 10 cm.

A cyan print-out image having reversed image values with respect to the original was obtained.

By replacing the colour coupler defined above with colour couplers having respectively the following structural formulae magenta and yellow dye images were formed.

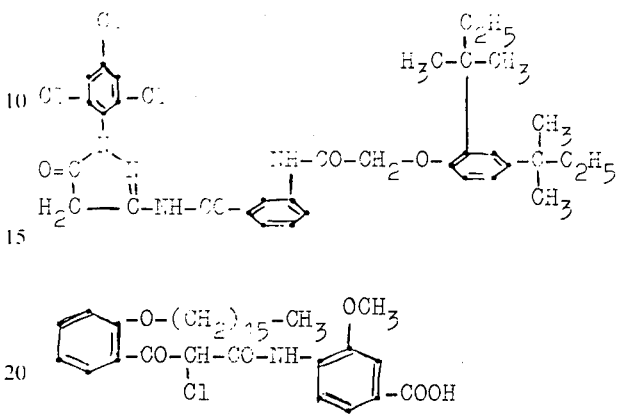

EXAMPLE 2

The photolytic formation of aniline was demonstrated in the following experiment: an ethanolic solution of compound 1 in a concentration of $1 \times 10^{-2}$ mole per litre was irradiated in PYREX glass tube with a high pressure mercury vapour lamp of 100 W placed at a distance of 15 cm. After 5 min. the irradiation was stopped and sodium 1,2-naphthoquinone-4-sulphonate was added. A red dye was formed characteristic for the presence of aniline (see F. Feigl, Spot Tests in Organic Analysis; Elsevier Publ. Co. London (1966), 153).

EXAMPLE 3

In an experiment analogous to that described in Example 2 an ethanolic solution of compound 3 in a concentration of $1 \times 10^{-2}$ mole per litre was irradiated for 10 min. The pH of the solution increased to about 8 during the irradiation as was demonstrated by the colour change of commercial pH-indicator paper and by the colour of the produced amine.

I claim:

1. In a photographic process in which an amine is imagewise released from an amine source carried on a support and including the step of imagewise exposing said support to activating radiation, the improvement wherein said amine source is a photosensitive amine progenitor corresponding to the following general formula:

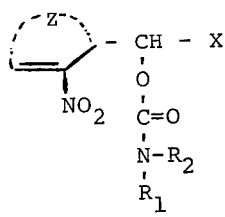

in which:
Z represents the necessary atoms to close a nitro-substituted aryl group,
X is a nitro-substituted aryl group,
$R_1$ is hydrogen, an aliphatic group, a cycloaliphatic group, or an aromatic group, and
$R_2$ is hydrogen.

2. A photographic material comprising a support carrying a photosensitive amine progenitor corresponding to the following general formula:

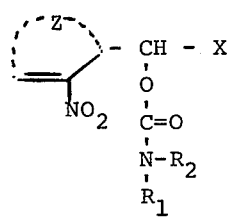

in which:
Z represents the necessary atoms to close a nitro-substituted aryl group,
X is a nitro-substituted aryl group,
$R_1$ is hydrogen, an aliphatic group, a cycloaliphatic group, or an aromatic group, and
$R_2$ is hydrogen, said progenitor is present in a binder medium carried as a layer on said support.

3. A process according to claim 1, wherein $R_1$ is hydrogen and $R_2$ is a p-dialkylaminophenyl group.

4. A process according to claim 1, wherein $R_1$ is hydrogen and $R_2$ is an alkyl group.

5. A process according to claim 3, wherein the photosensitive amine progenitor in the exposure step splits off a p-phenylenediamine, which is capable of forming an indophenol or azamethine dye by oxidative coupling with a phenol, naphthol or active methylene type colour coupler.

6. A process according to claim 5, wherein the oxidative coupling takes place by means of an oxidant incorporated in the recording material, said oxidant being peroxysebacic acid.

7. A process according to claim 6 wherein the peroxysebacic acid is incorporated in the recording material in the form of an inclusion compound in urea.

8. A process according to claim 1 wherein the photosensitive amine progenitor is present in a binder layer on said support.

9. A photographic material according to claim 2 wherein said photosensitive amine progenitor yields an amine effective as a color developer and said progenitor is present in admixture with a phenol, naphthol and/or active methylene type coupler.

10. A photographic material according to claim 9, wherein the photosensitive amine progenitor is present in admixture with peroxipebacic acid.

* * * * *